Patented Jan. 13, 1948

2,434,552

UNITED STATES PATENT OFFICE 2,434,552

POLYMERIZATION PROCESS

Norman M. Elmore, Elizabeth, and Hector C. Evans, Cranford, N. J., assignors to Standard Oil Development Company, a corporation of Delaware No Drawing. Application July 30, 1942, Serial No. 452,910

3 Claims. (Cl. 260—94)

This invention relates to olefinic polymers; relates especially to catalysts for the preparation of olefinic polymers; and relates particularly to solutions of boron trifluoride in a carrier solvent suitable for addition to a refrigerant-diluent supply in an olefinic polymerization reaction.

It has been found possible to polymerize iso-olefins, such as isobutylene, into relatively high molecular weight polymers having molecular weights above about 1000, which are oily fluids in the lower molecular weight ranges; sticky, semiplastic, very viscous fluids in slightly higher ranges, and above about 25,000 molecular weight, elastic rubber-like solids. These materials are very valuable for many purposes, including lubricating oil thickeners, insulating materials and diluents for many other purposes. The polymerization is customarily conducted by the application to the iso-olefin of gaseous boron trifluoride, preferably in the presence of a diluent-refrigerant. However, boron trifluoride is relatively insoluble in the mixtures of iso-olefin and diluent-refrigerant, especially in mixtures containing such refrigerants as liquid ethane or liquid propane and the like, and, accordingly, when the catalyst is added by bubbling the gas through the polymerization mixture, a relatively very poor utilization of the catalyst occurs. That is, laboratory experiments have shown that isobutylene can be polymerized to the desired high molecular weight polymers by as little as from $1/10\%$ to $2/10\%$ of boron trifluoride per 100% of isobutylene, but in the commercial polymerization procedure where the boron trifluoride is bubbled through the polymerization mixture, the quantity required is found to be from 3% to 5% or higher of the isobutylene present.

Attempts have been made to dissolve the boron trifluoride in the unpolymerizable diluent-refrigerant; that is, to dissolve the boron trifluoride in the liquid ethane or propane before the isobutylene is added for polymerization. However, the solubility of gaseous boron trifluoride in liquid ethane or propane is extremely low, and the maximum solubility in the permissible amount of liquid refrigerant does not provide enough boron trifluoride for satisfactory polymerization. Also, when the liquid refrigerant is added to the reaction vessel, there is an immediate boiling of the liquid, and it is found that this initial boiling strips the boron trifluoride out of the refrigerant, carrying it away before it has a chance to polymerize the isobutylene.

The present invention is based upon the fact that boron trifluoride is extremely soluble in liquid methyl chloride; so soluble that 100 parts by weight of liquid methyl chloride will dissolve 100 parts by weight of gaseous boron trifluoride at $-88°$ C. and the further fact that a solution of boron trifluoride in methyl chloride is highly soluble in liquid ethane or propane and the boron trifluoride is held in the liquid by the methyl chloride and is not stripped out by the initial boiling of the refrigerant. Accordingly, a maximum utilization of catalyst is obtainable thereby.

The invention consists, accordingly, in the preparation of a strong solution of boron trifluoride in methyl chloride and the preparation of separate mixtures respectively consisting of a mixture of the iso-olefin, usually isobutylene, in the liquid diluent-refrigerant, usually liquid ethane or propane, and a second mixture consisting of liquid refrigerant containing an appropriate amount of the solution of boron trifluoride in methyl chloride. These two mixtures are then intermixed in a suitable reactor, preferably with appropriate stirring means and suitable means for the removal of the finished polymer.

Thus, the present invention consists broadly in the preparation of an initial solution of boron trifluoride catalyst, the mixing of that catalyst solution with a diluent-refrigerant; the simultaneous preparation of a mixture of polymerizable olefin with diluent-refrigerant, and the combining of the two mixtures, preferably in the form of simultaneous streams, discharged into a reactor, preferably equipped for continuous operation. Other objects and details will be apparent from the following description.

In practicing the invention, the gaseous boron trifluoride is bubbled into and through a suitable absorbing liquid, which is preferably methyl chloride, but alternatively may be ethyl chloride or carbon disulfide or the like. This mixture may be a saturated solutiton of the boron trifluoride in the solvent, which, in the case of methyl chloride, is approximately 50 parts by weight of methyl chloride with 50 parts by weight of boron trifluoride; or may be a lower concentration according to the operating exigencies, down to as low as 5% or 10%. This mixture is stable and may be preserved at low temperatures or under pressure for indefinite periods of time.

A desirable polymerization mixture for isobutylene contains from 150 to 400 parts by weight of refrigerant, such as liquid ethane or propane, per 100 parts by weight of isobutylene.

In practicing the present invention, it is desirable to divide the liquid ethane or propane into two portions which conveniently may readily be about equal. One of these portions is mixed with the isobutylene, and the other portion is mixed with the catalyst solution. The amount of catalyst solution added to the second portion of liquid ethane or propane should be determined in terms of the amount of boron trifluoride dissolved therein, and the amount of boron trifluoride carried in the solution should be from 0.1% to 0.5% of the amount of isobutylene to be polymerized. If isobutylene of relatively high purity is used, this amount of boron trifluoride is ample.

However, in the event that relatively low molecular weight polymers are being made from relatively impure isobutylene, that is from a purified C₄ cut, which may contain substantial percentages of normal butenes and other catalyst poisons, the amount of catalyst required must be increased and, in some instances, amounts as high as 1% to 3% or 4% must be used. However, this procedure permits the making of good polymers from materials containing amounts of impurities which otherwise could not be polymerized to polymers much above the dimer and trimer condition. The respective portions of refrigerant respectively containing the isobutylene and the catalyst are then mixed together. The amount of boron fluoride in the alkyl chloride paraffinic refrigerant solution is in the range of .04% to 2.4%.

This mixing may occur as a batch operation in a suitable reactor equipped with means for discharging the finished polymer, or the reaction may be conducted in a continuous process suitable for continuous operation. A particularly advantageous device for this purpose is shown in the copending application, Serial No. 368,967, filed December 7, 1940, for M. D. Mann. This continuous polymerizing device consists of a series of Werner-Pfleiderer type of kneaders arranged so that the kneading blades of each kneader will discharge solid polymer into the next consecutive kneader at a lower level, and the last kneader discharges the polymer into an extruder which discharges the polymer through an extrusion plate, the whole system being sealed against the loss of gaseous volatilization products. In this equipment, the present invention is particularly advantageous, since the respective portions of diluent with the contained isobutylene and catalyst solution are delivered as streams through suitable pipe connections into the first kneader, and the polymerization occurs quickly therein.

The present invention is particularly applicable to continuous processing, since it permits of the delivery of separate streams of catalyst in refrigerant and polymerizate in refrigerant, side by side, with the mixing occurring at a sufficient distance from the delivery nozzles to establish a reaction zone at a substantial distance from the delivery nozzles.

The resulting polymer is of very high grade, and contains a minimum of catalyst, and requires a minimum of processing to remove the residual traces of catalyst.

Example 1

A mixture was prepared consisting of 100 parts by weight of isobutylene with 150 parts of liquid ethane. Simultaneously, a catalyst solution was prepared by passing boron trifluoride into methyl chloride at a temperature of approximately −88° C., until a solution consisting of about 60 parts by weight of methyl chloride and 40 parts by weight of boron trifluoride was obtained. Approximately ½ part by weight of this solution was added to 150 parts by weight of liquid ethane. The two liquid ethane solutions were then delivered at approximately equal rates of speed through delivery nozzles to a continuous polymerizing equipment, over a period of time of several hours. The material polymerized promptly to yield a polymer of approximately 100,000 molecular weight, and over a period of 96 hours of continuous operation of the continuous processing equipment, no plugging of the delivery nozzles occurred.

Example 2

A mixture was prepared consisting of 98 parts by weight of isobutylene, 2 parts of piperylene and 100 parts of liquid ethane. Simultaneously, another mixture was prepared consisting of 200 parts of liquid ethane with 2 parts by weight of a solution of boron trifluoride in methyl chloride having a concentration of 50 parts by weight of methyl chloride to 50 parts by weight of boron trifluoride. These two mixtures were then further admixed in an appropriate polymerization reactor and the polymerization occurred promptly to yield a copolymer of isobutylene and piperylene having a molecular weight of approximately 30,000, a mol per cent of unsaturation of approximately 1.2%, and an iodine number of approximately 4.5. The resultant material was a white, plastic, solid copolymer.

This copolymer was mixed according to the following recipe:

| | Parts |
|---|---|
| Copolymer | 100 |
| Zinc oxide | 5 |
| Stearic acid | 1½ |
| Sulfur | 1½ |
| Tuads (tetramethyl thiuram disulfide) | 1 |

This mixture was prepared upon an open roll mill and the compound was placed in a mould and cured at a temperature of approximately 145° C. for 60 minutes. Test samples cut from the cured polymer showed a tensile strength of 1,750 pounds per square inch and an elongation at break of approximately 1,050%.

Example 3

A mixture was prepared consisting of approximately 100 parts by weight of propylene with approximately 100 parts by weight of liquid ethane. Simultaneously, boron trifluoride was bubbled into ethyl chloride until the solution consisted of approximately 50 parts by weight of boron trifluoride with 50 parts by weight of ethyl chloride. Approximately 25 parts by weight of this catalyst solution were then mixed with approximately 75 parts by weight of liquid ethane, and the mixtures were then admixed. A prompt polymerization reaction occurred to yield an excellent polymer of propylene.

The above example of mixed olefins utilizes isobutylene and piperylene. The reaction works equally well with mixtures of isobutylene and isoprene; with mixtures of isobutylene and chloroprene; with mixtures of isobutylene and dimethylbutadiene; with mixtures of isobutylene and butadiene, although relatively considerably larger quantities of catalyst are required; with mixtures of isobutylene and styrene; with mixtures of butadiene and styrene; and many other polymerizable olefinic materials, which will be obvious to those skilled in the art.

Thus, the invention consists in a process utilizing the steps of dissolving boron trifluoride to a high concentration in a volatile solvent and adding the boron trifluoride solution to a refrigerant before the addition thereto of the polymerizable olefin.

While there are above disclosed but a limited number of embodiments of the invention, it is possible to provide still other embodiments without departing from the inventive concept herein disclosed, and it is therefore desired that only such limitations be imposed upon the appended claims as are stated therein or required by the prior art.

The invention claimed is:

1. A low temperature polymerization process for the polymerization of isobutylene in the presence of 150 to 400 parts of a liquefied paraffinic hydrocarbon internal refrigerant containing 2 to 3 carbon atoms per molecule per 100 parts of isobutylene, which comprises dissolving isobutylene in one portion of the internal refrigerant, dissolving boron trifluoride in an alkyl chloride containing 1 to 2 carbon atoms per molecule to yield a solution having a boron trifluoride concentration within the range of 10% to 50%, diluting the boron trifluoride solution with another portion of said internal refrigerant so that the resulting solution contains from .04% to 2.4% of boron trifluoride and from 0.1% to 4% of boron trifluoride calculated on the amount of isobutylene to be polymerized and then mixing the diluted boron trifluoride-alkyl chloride-refrigerant solution with the refrigerant-isobutylene solution to polymerize isobutylene.

2. In a low temperature olefinic polymerization reaction in the presence of 150 to 400 parts of a liquefied normally gaseous internal hydrocarbon refrigerant per 100 parts of isobutylene, the method of stabilizing gaseous boron trifluoride and preventing stripping out of the boron trifluoride by the volatilization of the hydrocarbon refrigerant, which comprises dissolving boron trifluoride in a liquid alkyl chloride containing 1 to 2 carbon atoms per molecule to a concentration within the range between 10% and 50%, adding the alkyl chloride-boron trifluoride solution to a portion of said paraffinic hydrocarbon refrigerant containing 2 to 3 carbon atoms per molecule to produce a dilute solution of the boron trifluoride containing from .04% to 2.4% of boron trifluoride and from 0.1% to 4% of boron trifluoride calculated on the amount of isobutylene, mixing isobutylene with the rest of the paraffinic hydrocarbon refrigerant containing 2 to 3 carbon atoms per molecule and then adding the isobutylene-refrigerant mixture to the alkyl chloride-boron trifluoride-refrigerant mixture to polymerize isobutylene.

3. The method of polymerizing isobutylene in the presence of 150 to 400 parts of a liquefied paraffinic hydrocarbon internal refrigerant containing 2 to 3 carbon atoms per molecule per 100 parts of isobutylene, which comprises mixing isobutylene with one portion of a liquefied normally gaseous paraffinic hydrocarbon refrigerant containing 2 to 3 carbon atoms per molecule, preparing a solution of boron trifluoride in an alkyl chloride containing 1 to 2 carbon atoms per molecule to a concentration within the range of 10% and 50%, diluting the boron trifluoride-alkyl chloride solution by mixing therewith a further portion, equal to said first portion, of said liquefied hydrocarbon refrigerant so that the resulting solution contains from .04% to 2.4% of boron trifluoride and from 0.1% to 4% of boron trifluoride calculated on the amount of isobutlene and thereafter combining the two mixtures to polymerize isobutylene while retaining the boron trifluoride in the polymerization mixture by the holding action of the alkyl chloride.

NORMAN M. ELMORE.
HECTOR C. EVANS.

REFERENCES CITED

The following references are of record in the file of this patent:

UNITED STATES PATENTS

| Number | Name | Date |
|---|---|---|
| 2,269,421 | Arveson | Sept. 30, 1942 |
| 2,276,893 | Thomas | Mar. 17, 1942 |

FOREIGN PATENTS

| Number | Country | Date |
|---|---|---|
| 483,453 | Great Britain | Apr. 20, 1938 |
| 491,739 | Great Britain | Sept. 8, 1938 |
| 106,371 | Australia | Jan. 26, 1939 |

OTHER REFERENCES

Germann and Cleaveland: Science 53, 482 (1921) 1 page.

Germann and Cleaveland: Science 53 page 582 (1921).